June 26, 1928.
H. G. NORWOOD
1,674,986
CASTELLATED NUT AND METHOD OF MAKING THE SAME
Original Filed March 16, 1925
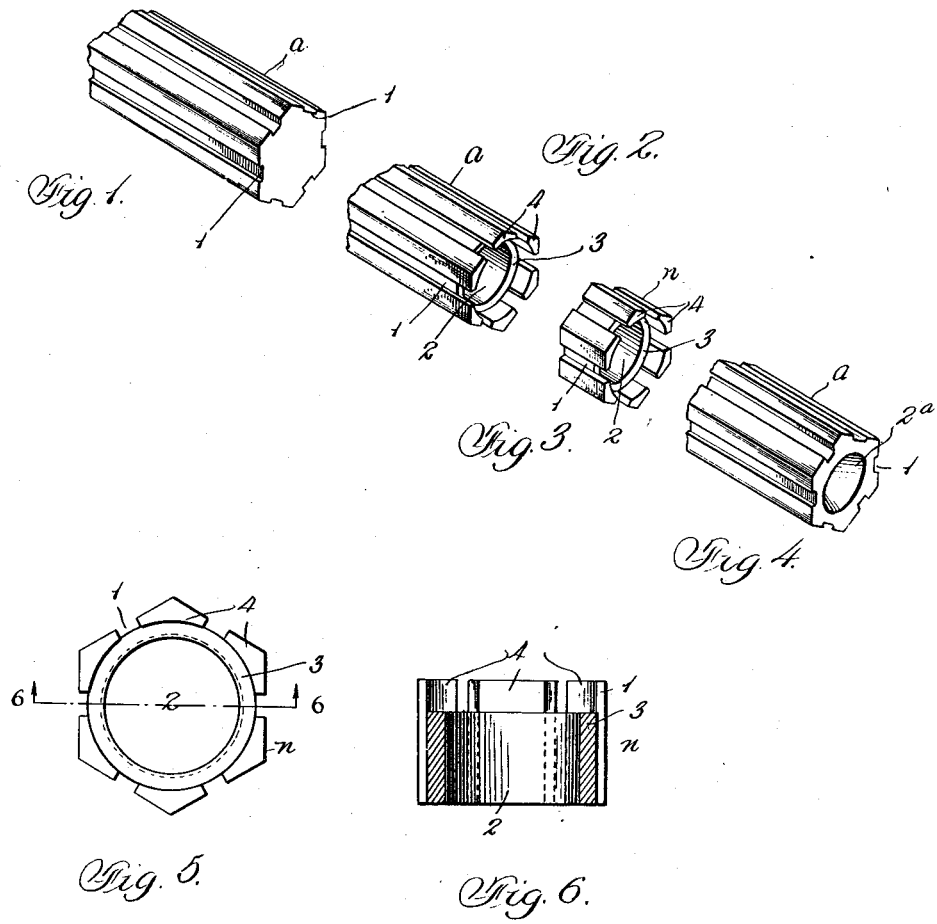
Inventor
Harry G. Norwood.
By Robert Watson
Attorney Patented June 26, 1928.

1,674,986

UNITED STATES PATENT OFFICE.

HARRY G. NORWOOD, OF BALTIMORE, MARYLAND, ASSIGNOR OF ONE-THIRD TO WILLIAM C. O'BRIEN AND ONE-THIRD TO CHARLES B. ROGERS, BOTH OF BALTIMORE, MARYLAND.

CASTELLATED NUT AND METHOD OF MAKING THE SAME.

Application filed March 16, 1925, Serial No. 15,996. Renewed July 18, 1927.

This invention relates to a method of making castellated nuts and to the nut made according to said method. In carrying out the invention, I provide a metal bar preferably, though not necessarily angular in cross section, and having shallow grooves extending longitudinally of the bar and evenly spaced apart circumferentially of the bar. Where the bar is angular in cross section, these grooves are located centrally in the several faces of the bar. In forming a nut from the bar, the end of the bar is bored centrally, to form the hole in the nut, and at the same time the bar is counterbored for a short distance to a diameter which causes the inner wall of the counterbored part to intersect the grooves in the bar. Thus, the bottoms of the channels or grooves in the bar are removed from the counterbored part of the rod, leaving the parts between the grooves standing as a castellated rim. The bar is then severed at a suitable distance back of the castellated rim and the cut-off part is a castellated nut, complete except for the threading operation. In a suitable automatic machine, provided with a boring and counterboring tool and a cross-cutting tool and suitable feeding mechanism for the bar, the nuts may be made quite cheaply and quickly and with only two operations.

In the accompanying drawing,

Fig. 1 is a perspective view of a bar from which the nuts are to be made;

Fig. 2 is a similar view showing the end of the bar after it has been bored and counterbored;

Fig. 3 is a similar view showing the nut cut off from the end of the bar;

Fig. 4 is a similar view showing the bar after the nut has been cut off;

Fig. 5 is a plan view of the castellated end of a nut made according to my invention; and, Fig. 6 is a section through the same on the line 6—6 of Fig. 5.

Referring to Fig. 1 of the drawing, $a$ represents a metal bar which, as shown in the drawing, is hexagonal in cross section and formed with relatively shallow grooves 1, extending longitudinally of the bar in the central part of each of its faces. In forming the nuts from this bar, the end of the bar is bored centrally, as indicated at 2, in Fig. 2, to form the hole in the nut, and at the same time, and with the same tool, the end of the bar is counterbored for a short distance, as indicated at 3, the radius of the counterbored part being slightly greater than the distance from the center of the bar to the center of one of the channels, so that the counterbored part intersects the channels, and the counterboring tool removes the bottoms of the channels, leaving the parts 4 between the channels standing as a castellated rim. With a cross-cutting tool, the bar is severed at a suitable distance back of the counterbored part, the severed portion constituting the nut $n$, Fig. 3, which is complete except for the internal threading of the nut. After a nut has been cut off, the end of the bar presents the appearance shown in Fig. 4, in which $2^a$ is the conical opening made by the point of the boring tool, in the previous operation. It will be evident that by boring and counterboring this end of the bar and cutting off the bar at the proper distance back of the counterbored part, another nut will be formed.

Round bars may be used, if desired, to form the nuts, but this requires deeper grooves in the periphery of the bar for the same amount of metal in the castellations than is necessary where the bars are of angular cross section. It is also desirable, of course, to make the nuts of angular cross section for convenience in turning them with wrenches.

What I claim is:

1. A castellated nut having a plurality of faces and a longitudinal groove in the central part of each face, said nut having a central opening and a counterbore in one end, the latter intersecting said grooves.

2. The method of making a castellated nut which comprises forming longitudinally extending spaced grooves in the sides of the metal body from which the nut is to be made, boring said body to provide a central opening and counterboring one end of said body to a diameter such that the wall of the counterbored part intersects the grooves.

3. The method of making castellated nuts which comprises forming a metal bar with longitudinal grooves spaced apart about the bar, boring a central opening in the end of the bar, counterboring said end to a diameter such that the wall of the counterbored part intersects the grooves, cutting off the end portion of the bar at a point back of the counterbored part, and repeating the boring, counterboring and cutting off operations on successive end portions of the bar.

4. The method of making castellated nuts which comprises forming a metal bar with a plurality of angular faces and with longitudinal grooves midway of the faces, boring a central opening in the end of the bar, counterboring said end to a diameter such that the wall of the counterbored part intersects the grooves, cutting off the end portion of the bar at a point back of the counterbored part, and repeating the boring, counterboring and cutting off operations on successive end portions of the bar.

In testimony whereof I hereunto affix my signature.

HARRY G. NORWOOD.